United States Patent [19]

Holland et al.

[11] 3,868,408

[45] Feb. 25, 1975

[54] ETHYLENICALLY UNSATURATED DICARBOXYLIC ACID ESTERS OF α, α-DIHYDROPERFLUORO ALCOHOLS

[75] Inventors: Dewey George Holland, Allentown; Burton David Beitchman, Springfield, both of Pa.

[73] Assignee: Air Products and Chemicals, Inc., Allentown, Pa.

[22] Filed: Sept. 27, 1971

[21] Appl. No.: 184,264

[52] U.S. Cl.... 260/485 F, 117/126 GB, 117/132 R, 117/138.8 A, 117/138.8 F, 117/138.8 N, 117/138.8 UA, 117/139.5 A, 117/143 A, 117/145, 117/155 UA, 117/161 K, 260/78.4 E, 260/78.5 B, 260/78.5 E, 260/457, 260/458, 260/879, 260/884
[51] Int. Cl....................... C07c 69/52, C07c 69/60
[58] Field of Search.................................. 260/485 F

[56] References Cited
UNITED STATES PATENTS

| | | | |
|---|---|---|---|
| 2,778,850 | 1/1957 | Barr et al. | 260/485 F |
| 3,223,725 | 12/1965 | Hill | 260/485 F |
| 3,239,557 | 3/1966 | Fasick | 260/485 F |
| 3,385,882 | 5/1968 | Tullio | 260/48 F |
| 3,671,574 | 6/1972 | Knell et al. | 260/485 F |

OTHER PUBLICATIONS

Groggins, Unit Processes in Org. Synthesis, pp. 601 & 602, (1952).

*Primary Examiner*—Lorraine A. Weinberger
*Assistant Examiner*—E. Jane Skelly
*Attorney, Agent, or Firm*—Richard A. Dannells; Barry Moyerman

[57] ABSTRACT

The alpha, beta-ethylenically unsaturated dicarboxylic acid ester of an alpha, alpha-dihydroperfluoroalcohol is prepared by sulfation of the fluorinated alcohol with oleum, sulfur trioxide or chlorosulfonic acid and subsequent esterification of the resulting sulfate with maleic, fumaric, mesaconic, citraconic or itaconic acid. The resulting alpha, beta-ethylenically unsaturated esters of the alpha, alpha-dihydroperfluoroalcohols can be polymerized and applied to materials as coating compositions with high glass transition temperatures, high utility temperatures and resistance to soiling.

10 Claims, No Drawings

ETHYLENICALLY UNSATURATED DICARBOXYLIC ACID ESTERS OF α, α-DIHYDROPERFLUORO ALCOHOLS

FIELD OF THE INVENTION

This invention is related to fluorinated esters and more particularly, is directed to maleic, fumaric mesaconic, citraconic or itaconic esters of alpha, alpha-dihydroperfluoroalcohols prepared by reacting a fluorinated alcohol with oleum, sulfur trioxide or chlorosulfonic acid and then esterifying the resulting sulfate using maleic, itaconic, mesaconic, citraconic or fumaric acid. These esters of the fluorinated alcohols can be homopolymerized or copolymerized to obtain polymeric materials having high glass transition temperatures. The polymeric materials impart oil, water and soil repellent characteristics when applied to substrates and are especially useful for soil-, oil-, and water-proofing textiles and as metal coatings.

BACKGROUND OF THE INVENTION

The alpha, alpha-dihydroperfluoroalkyl and cycloalkyl maleic, itaconic, mesaconic, citraconic or fumaric esters constitute a group of monomers capable of either homopolymerization or copolymerization with such other monomers as alkylvinyl ethers; alphaolefins; substituted styrene; vinyl esters; chloro-, fluoro- or cyano ethylenes; acrylates, methacrylates; acrylic acid, methacrylic acid and the like. In addition to their utility in forming useful intermediates, polymers and copolymers of these esters have utility in coating compositions and are capable of imparting oleophobic, hydrophobic and soil repellency characteristics to various fibrous and metallic substrates.

None of the conventional esterification procedures appear to be suitable for the preparation of alpha, alpha-dihydroperfluoroalkyl or cycloalkyl maleic, fumaric, mesaconic, citraconic or itaconic esters. For example, the preparation of such esters is not known and the telogens necessary for telomerization to alpha, alpha-dihydroperfluorocarbinols are not available.

Furthermore, the application of conventional esterification processes to the preparation of diesters from polybasic acids, such as maleic acid, fumaric acid, mesaconic acid, citraconic acid or itaconic acid, and alpha, alpha-dihydroperfluoroalcohols would be unselective, even if feasible theoretically. Due to the low reactivity of alpha, alpha-dihydroperfluorinated alcohols, direct esterification using itaconic acid or fumaric acid would be impractical. In addition, transesterification would be neither economical nor practical. Efforts to prepare esters of alpha, beta-unsaturated acids by reacting such fluoroalcohols with acid halides such as fumaryl chloride would, based on other experience, be uneconomical and would lead to byproduct contamination due to the addition of the evolved hydrochloric acid to the olefinic bond of the desired product.

Other general methods of producing esters would similarly be unsatisfactory. Trifluoroacetic anhydride has been suggested as an esterifying agent. One disadvantage of such a method is that equal molar amounts of expensive anhydride must be used. Yet another method for producing esters involves the use of relatively large amounts of polyphosphoric acid. This method gives inconsistent results and, in general, very poor yields.

A unique method has now been discovered for obtaining alpha, beta-ethylenically unsaturated dicarboxylic acid esters of alpha, alpha-dihydroperfluoroalcohols. The resulting esters can be converted to polymerizable derivatives retaining the carbonyl radical which are effective as treating and modifying agents for textile fabrics and other surfaces. Surfaces treated with such polymeric materials have oil repellency, soil repellency and durable water repellency when coapplied with nonfluorochemical water repellent additives which are not especially durable to laundering or drycleaning, when applied alone.

SUMMARY OF THE INVENTION

It is an object of this invention to provide an improved and simplified process for the preparation of a maleic, fumaric, mesaconic, citraconic or itaconic ester of an alpha, alpha-dihydroperfluoroalcohol.

Another object of this invention is to provide a method for preparing a maleic, fumaric, mesaconic, citraconic or itaconic ester of an alpha, alpha-dihydroperfluoroalcohol in high yield.

A further object of this invention is to provide maleic, fumaric, mesaconic, citraconic and itaconic esters of perfluorinated alcohols.

Still another object of this invention is to provide polymeric materials which will impart oil, water and soil repellency characteristics to substrates.

Yet another object of the invention is to provide as new compositions of matter polymers from maleic, fumaric, mesaconic, citraconic or itaconic esters of alpha, alpha-dihydroperfluoroalcohols.

In accordance with the present invention, an alpha, beta-ethylenically unsaturated dicarboxylic acid ester of an alpha, alpha-dihydroperfluoroalcohol is prepared by reacting oleum, sulfur trioxide or chlorosulfonic acid with a fluorocarbinol having the formula: $R_fCH_2OH$ (Formula I) where $R_f$ is $C_nF_{2n+1} + C_6F_{10} + b$ and where $C_6F_{10}$ represents a monosubstituted or disubstituted perfluorocyclohexane ring, and where $b$ is either 0 or 1; $n$ is an integer from 0 to 4 when $b$ is 1 and $n$ is an integer from 1 to 10 when $b$ is 0. The resulting sulfate ester is reacted with either maleic, fumaric, mesaconic, citraconic or itaconic acid to obtain, as new compositions of matter, the desired ester of the fluorocarbinol of Formula I. The resulting esters of the fluorinated alcohols can be polymerized or copolymerized, with a compatible monomer, by conventional polymerization techniques to obtain polymeric materials having useful characteristics including high thermal stability, high glass transition temperatures and hydrolytic stability.

Oil, water and soil repellency are obtained when monomers or polymeric materials prepared in accordance with the present invention are applied to suitable substrates.

DESCRIPTION OF THE PREFERRED EMBODIMENTS

The process of the present invention can be illustrated by means of the following equations:

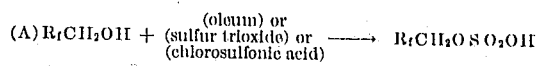

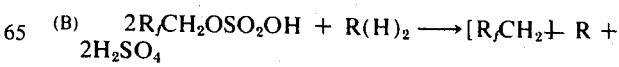

In the above equations, the structure of the fluorocarbinol which is reacted with oleum, sulfur trioxide or chlorosulfonic acid (Equation A) is the structure of Formula I. In Equation B, R is either $-\!\!\{OCOCH\!:\!CHOCO\}\!\!-$, $-\!\!\{OCOCH\!:\!C(CH_3)OCO\}\!\!-$, or $-\!\!\{OCOC(CH_2)CH_2\}\!\!-$.

Fluorocarbinols coming within the scope of Formula I include the following materials:

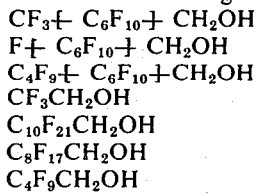

$CF_3\!\!-\!\!\{C_6F_{10}\}\!\!-CH_2OH$
$F\!\!-\!\!\{C_6F_{10}\}\!\!-CH_2OH$
$C_4F_9\!\!-\!\!\{C_6F_{10}\}\!\!-CH_2OH$
$CF_3CH_2OH$
$C_{10}F_{21}CH_2OH$
$C_8F_{17}CH_2OH$
$C_4F_9CH_2OH$ where $-\!\!\{C_6F_{10}\}\!\!-$ is a disubstituted perfluorocyclohexane group. It will be understood that in Formula I, the group $C_nF_{2n+1}$ can be attached to the ring structure of the perfluorocyclohexane group at either the 2-, 3- or 4- position. The preferred fluorinated alcohol used is alpha, alpha-dihydropentadecafluorooctanol.

The sulfating agent used in the present invention is either oleum (fuming sulfuric acid), sulfur trioxide or chlorosulfonic acid. Oleum can be used in varying strengths such as about 15 to about 65 %, but concentrations between about 30 and about 65 % are normally employed. The preferred sulfating agent is 60 % oleum, the percentage indicating the available percentage of $SO_3$ as $H_2S_2O_7$.

In general, the alpha, alpha-dihydroperfluoroalcohol and sulfating agent can be reacted in molar equivalents. However, it is preferred to use a slight excess of the sulfating agent over that required for the stoichiometric reaction to insure complete reaction of the alcohol. An excess of up to 20 mole percent can be employed and preferably at least about 5 mole percent excess of the sulfating agent is employed. The reaction of Equation A can be carried out at a temperature between about 0 degrees C. and about 120 degrees C., provided the boiling point of the sulfating agent is not exceeded. Preferably, the reaction of Equation A is carried out at a temperature between about 30 degrees C. and about 80 degrees C. The reaction time will vary depending upon the strength of the sulfating agent employed and the temperature and can vary from about 1 to about 10 hours.

When chlorosulfonic acid is used as the sulfating reagent, the reaction is preferably stirred while at reduced pressure in order to evolve all of the hydrogen chloride produced.

In Equation B the best yields of ester are obtained when an excess of the alcohol sulfate relative to the maleic, fumaric, mesaconic, citraconic or itaconic acid is employed since this tends to minimize undesirable side reactions, such as the formation of anhydrides. Molar ratios of greater than 2:1 fluoroalcohol sulfate to dibasic acid are desirable and preferably the ratio of fluoroalcohol sulfate to dibasic acid is maintained between 2 and 3. Ratios lower than 2:1 can be employed but yields of the desired ester will be diminished and difficulties in the isolation of the desired esters will be experienced.

The addition of maleic, fumaric, mesaconic, citraconic or itaconic acid in Equation B is carried out at temperatures between about 50 and about 160 degrees C. and preferably in the range of between about 80 and about 100 degrees C.; the upper limit for the temperature range being determined by the materials used. Lower temperatures than 50 degrees C. can be used but tend to be impractical with respect to reaction time. If the temperatures are maintained above about 50 degrees C. reaction times will normally vary from 30 minutes to 5 hours. Preferably, however, the reaction time is less than about 2 hours.

A polymerization inhibitor such as hydroquinone, methylene blue or copper wire can, if desired, be employed in a minor amount during the reaction of Equation B in order to prevent polymerization. Other polymerization inhibitors include phenothiazine and para-methoxyphenol. The polymerization inhibitor is used in a conventional proportion, such as an amount between about 0.05% and about 2% by weight, based on the perfluorinated alcohol starting material.

While the maleate, fumarate, mesaconate, citraconate or itaconate esters can be distilled directly from the reaction mixture obtained by Equation B, yields are low and separation of the desired esters from the by-products is difficult. Accordingly, distillation is not a satisfactory procedure for isolating the product. However, a good yield of the product can be obtained by aqueous dilution, by carefully adding the reaction mixture of Equation B to water or ice and separating the crude product by either centrifuging or extraction with a solvent immiscible with water. Generally the amount of water or ice should be at least equivalent in volume to the reaction mixture.

Suitable extractants for the product include ether, hexafluoroxylene, a mixture of perfluoro-2-n-butyltetrahydrofuran and perfluoro-2-propylpyran, or any water immiscible solvent in which the product exhibits solubility. Since the product obtained by extraction results in essentially product in the extractant, provided an excess of fluoroalcohol has been employed, purified liquid product can be obtained by vacuum distillation with a low number of theoretical plates. When the product is a solid it can be purified by recrystallization from a suitable solvent such as methanol or ethanol.

Whereas conventional procedures for preparing esters of fluorinated materials are either inefficient or too costly to be employed to obtain the maleate, fumarate, mesaconate, citraconate or fumarate esters of alpha, alpha-dihydroperfluoroalcohols, the present invention affords an economical procedure for obtaining such esters in yields as high as 80 to 90% or more.

The structures of the novel monomers produced in accordance with the present invention are typified by the following structures:

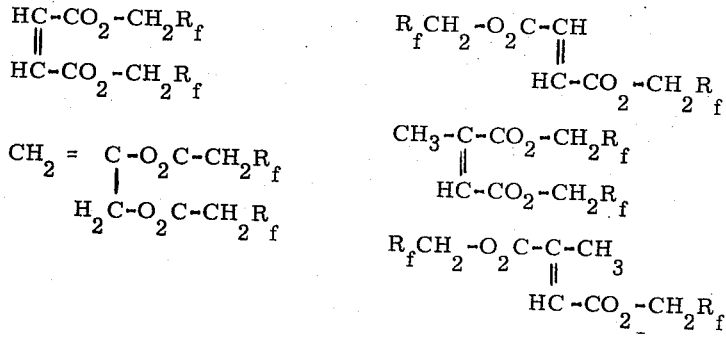

$$\begin{array}{l} HC-CO_2-CH_2R_f \\ \| \\ HC-CO_2-CH_2R_f \end{array}$$

$$\begin{array}{l} CH_2 = C-O_2C-CH_2R_f \\ \phantom{CH_2 = }| \\ \phantom{CH_2 = }H_2C-O_2C-CH_2R_f \end{array}$$

$$\begin{array}{l} R_fCH_2-O_2C-CH \\ \phantom{R_fCH_2-O_2C-}\| \\ \phantom{R_fCH_2-O_2}HC-CO_2-CH_2R_f \end{array}$$

$$\begin{array}{l} CH_3-C-CO_2-CH_2R_f \\ \phantom{CH_3-}\| \\ \phantom{CH_3-}HC-CO_2-CH_2R_f \end{array}$$

$$\begin{array}{l} R_fCH_2-O_2C-C-CH_3 \\ \phantom{R_fCH_2-O_2C-}\| \\ \phantom{R_fCH_2-O_2}HC-CO_2-CH_2R_f \end{array}$$

Some of the preferred monomers having the above structures include bis (undodecafluorodecyl carbinol) fumarate; bis (4,4'-perfluoroisopropylcyclohexane carbinol) mesaconate; bis (3,3'-perfluorocyclohexyl perfluorocyclohexane carbinol) fumarate; bis (alpha,alpha-dihydroperfluorocyclohexane carbinol) itaconate; bis (4, 4'-perfluorobutylcyclohexane carbinol) citraconate; bis (2, 2'-perfluoromethylcyclohexane carbinol) maleate; and bis (perfluoro-9-methyl-nonane carbinol) fumarate.

Techniques such as bulk polymerization, solution polymerization, emulsion polymerization and copolymerization can be employed for the preparation of polymeric materials. Among the solvents which can be used as a media for solution polymerization are trichlorofluoromethane; 1, 1, 2-trichloro-1, 2, 2-trifluoroethane; benzene; benzotrifluoride; xylene hexafluoride; 1, 1, 1-trichloroethane; and butyl acetate.

The polymerization temperature will vary with the technique employed and the initiator used. Polymerization temperatures can vary from about 30 degrees C. to about 130 degrees C. if autogeneous pressure is used. The preferred catalyst for bulk and solution polymerization, benzoyl peroxide, is normally employed between 40 degrees C. and 100 degrees C., but preferably such polymerization is conducted at a temperature between about 60 degrees C. and about 80 degrees C.

Free radical initiators include such initiators as potassium persulfate, ammonium persulfate, peroxyanhydrides such as benzoyl peroxide, peroxy esters such as t-butyl perbenzoate, ditertiary alkyl peroxides such as ditertiary butyl peroxide, and azo compounds such as azo bis (isobutyronitrile) or azo bis (isobutyramidine) dihydrochloride.

Emulsifying agents used for emulsion polymerization can be cationic, anionic or non-ionic emulsifying agents. Among the preferred emulsifying agents employed are the octylphenoxypolyethoxylates with 16 to 40 ethylene oxide units.

Additionally, a mercaptan chain modifier, preferably dodecylmercaptan, can be employed during polymerization.

Copolymers of the fluorochemical maleates, fumarates, mesaconates, itaconates and citraconates, containing about 0.1 to about 10% by weight, and preferably containing about 0.5 to about 5% by weight of functionally reactive monomers, improve the aqueous laundering and dry cleaning durability of copolymer treated fibrous materials and improve the adherence of the copolymer to metal substrates. Although percentages in excess of about 10% by weight can be employed, the use of amounts of comonomer in excess of about 10% by weight does not result in significant further improvement with respect to the durability of the oil and water repellency treatment. The comonomers which can be employed include the mono and polyunsaturated monomers as well as monomers having their ethylenically unsaturated group located in either terminal or internal positions in the monomer. Representative examples of such functionally reactive monomers include hydroxyethylacrylate, hydroxyethylmethacrylate, hydroxypropylacrylate, hydroxypropylmethacrylate, glycidyl acrylate, glycidyl methacrylate, N-methylol acrylamide, N-methylol methacrylate, methylolated diacetone acrylamide, methylolated diacetone methylacrylamide, hydroxyethyl vinyl ether, allyl alcohol, and mixtures thereof. The copolymers which are formed can include random copolymers, alternating copolymers, segmented copolymers, block copolymers, and graft copolymers.

The maleate, fumarate, mesaconate, citraconate and itaconate esters of alpha, alpha-dihydroperfluoroalcohols which are formed in accordance with the present invention have characteristics which are distinct from other esters of even the same perfluorinated carbinols. For example, acrylic esters of alpha, alpha-dihydroperfluorooctanol, prepared in accordance with the commonly assigned copending application Ser. No. 150,242, filed June 4, 1971, have a low glass transition temperature ($T_g$) of $-17$ degrees C. and polymers formed from such esters are of a soft to a rubbery consistency. $T_g$ may be defined as the temperature above which a polymer exhibits rubbery characteristics and this temperature is a very important property. In contrast to the acrylic esters of perfluorinated carbinols, hard, resistant, resinous products are obtained by polymerization of the compounds of the present invention comprising esters of maleic, fumaric, mesaconic, citraconic or itaconic acid and an alpha, alpha-dihydroperfluoroalcohol. The maleate, fumarate, mesaconate, citraconate and itaconate esters have glass transition temperatures ($T_g$) in the neighborhood of 60 to 80 degrees C. and higher.

There appears to be a correlation between soil repellency and $T_g$ values. The maleate, fumarate, mesaconate, citraconate and fumarate polymers of this invention (with higher $T_g$ values) show improved soil repellency over polymers with lower $T_g$ values. It is believed that the hard, resistant, resinous products of this invention may be responsible for this improved soil repellency.

Suitable substrates for the application of the compositions of this invention include metal surfaces which are going to be subjected to high temperature enviroments, films, fibers, yarns, fabrics, and articles made from filaments, fibers or yarns derived from natural, modified natural or synthetic polymeric materials or from blends of these. Specific examples are cotton, silk, wool, regenerated cellulose, nylon, fiber-forming linear polyesters, fiber-forming polyacrylonitrile, cellulose nitrate, cellulose acetate, ethyl cellulose, paper, fiberglass and the like. Dyed and undyed cotton sateen, poplin, broadcloth, jean cloth, gabardine, and the like are especially adaptable for treatment with the compositions of this invention to provide products having a high repellency to oil, water and soil. Materials rendered oil, water and soil repellent by the compositions of this invention retain a portion of the original repellency when laundered and dry cleaned.

Conventional coating and treating procedures can be used for applying the compositions of the present invention to the selected substrate. For example, the compositions of the present invention can be applied by brushing, dipping, spraying, padding, roll-coating or by any combination of these methods. When padding is used, pad baths are made up by accurately weighing out the fluorochemical latex, water repellents, and any other ancillary materials and then pouring the mixture into the padder tray. The polymers can, if desired, be dispersed in liquids other than water. Dry or pre-wetted fabric to be treated is passed through the bottom of the tray and the excess solution is removed, usually by passing the treated fabric through squeeze rollers. The rollers are adjusted to give a 75% wet pickup on 80 X 80 cotton and 45% wet pickup on 65-35 Dacron-cotton such that the dry pickup (weight of the dry polymer on fiber) is between about 0.05% and 10% by weight of the fiber. Therefore, a water dispersion of a polymeric mixture can contain from about 0.1% to about 15% by solids based on the total mixture. After the fabric has been treated, it can be hung vertically in a forced draft oven at an elevated temperature of 120 - 180 degrees C. for at least 15 seconds and preferably 3 to 5 minutes to impart maximum durability of the treating agent on the fabric. The resulting coated or impregnated fibrous material is found to be resistant to water and oil, and the fibrous material will retain its resistance even after many launderings and dry cleanings.

The oil, water and soil repellency characteristics of treated materials are determined in accordance with standard procedures outlined below.

The water repellency of treated fabrics was measured by Standard Test No. 22–52, published in the 1952 Technical Manual and Yearbook of the American Association of Textile Chemists and Colorists, Vol. XXVIII, page 136. The "spray rating" is expressed on a 0 to 100 scale, wherein 100 is the highest possible rating.

A rating of 100 indicates no water penetration or surface adhesion. A rating of 90 denotes slight random sticking or wetting on the fabric. A rating of 50 is still somewhat water repellent; while a rating of 0 indicates complete penetration and wetting.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture.

Oil repellency is tested by gently placing a drop of the test mixture on the surface of the treated fabric sample on a flat, horizontal surface. After 3 minutes, penetration or wicking into the fabric is observed visually. The oil repellency rating is the number corresponding to that mixture containing the highest percentage n-heptane which does not penetrate or wet the fabric after three minutes of contact. The division between failure and resistance of successive mixtures is generally quite sharp. Obviously, the higher the number, the greater the resistance to oil penetration.

The oil repellency rating numbers were chosen to correspond with the AATCC Standard Spray Ratings which are now in use for testing water repellent finishes.

| Oil Repellency Rating | Percent Heptane | Percent Mineral Oil |
|---|---|---|
| 100(+) | 60 | 40 |
| 100 | 50 | 50 |
| 90 | 40 | 60 |
| 80 | 30 | 70 |
| 70 | 20 | 80 |
| 50 | 0 | 100 |

Dry soil repellency is the dry soil stain resistance of treated material and is evaluated in accordance with the following procedure. For a practical evaluation, comparisons are made between the treated and untreated material.

Formula for a standard synthetic dry soil:

| Ingredient | Percent by weight |
|---|---|
| Peat moss (dry) | 38 |
| Cement | 17 |
| Kaolin clay | 17 |
| Silica | 17 |
| Furnace black | 1.75 |
| Red iron oxide | 0.50 |
| Mineral oil | 8.75 |

The test consists of pouring a small quantity of the above mixture into a paper bag with 4 × 4 inches samples of the material to be tested. The bag is then shaken vigorously for one minute, the contents dumped out and the samples brushed smartly several times on each side with the finger tips.

Comparison of dry soiling can be made by visual examination of the treated and untreated samples. According to this procedure, the samples are numerically evaluated on a 5-point scale — the lowest value for the best dry soil resistance: (1)Very good, (2) Good, (3) Satisfactory, (4) Bad, (5) Very bad.

The invention will be further illustrated by the following specific examples, it being understood that there is no intention to be necessarily limited by any details thereof since variations can be made within the scope of the invention.

EXAMPLE I

The ester di-(alpha, alpha-dihydroperfluorooctyl) itaconate was prepared by charging 100 grams of alpha, alpha-dihydroperfluorooctanol to a 3 neck flask equipped with a magnetic stirrer, a condenser, an addition funnel, a thermocouple well and a heating mantle. 30 % oleum (70 grams) was charged to the addition funnel and slowly added to the stirred alcohol. An exotherm up to 55 degrees C. occurred before all the acid was added. This mixture was allowed to cool to room temperature and the excess $SO_3$ was removed by vacuum during a 1-hour period.

The adding funnel was removed and itaconic acid (16.2 grams) was added. The resulting mixture was stirred and heated up to 85 degrees C. to aid in dissolving the itaconic acid. This temperature was held for one hour and then another portion of itaconic acid (8.2 grams) was added. The temperature was maintained for one additional hour while stirring and then the mixture was allowed to cool to room temperature.

The following day, 180 cubic centimeters of a mixture of perfluoro-2-n-butyltetrahydrofuran and perfluoro-2-propylpyran was added as an extractant to this mixture. The mixture was poured onto ice and three layers were formed, the middle layer being an emulsion.

The bottom fluorochemical layer was washed twice with water, the pH was adjusted to 5 using a 6.9% sodium bicarbonate solution and then the layer was washed 2 additional times with water. During these washings, centrifuging and decanting were employed to remove the upper aqueous layer. The fluorochemical layer was concentrated by flashing off the extractant at 45 to 50 degrees C. under vacuum.

The emulsified layer, obtained when the extractant and the reaction mixture were poured on ice, was treated with anhydrous sodium sulfate whereupon the emulsion broke. The extractant was removed by flash evaporation at 50 degrees C. under vacuum.

Distillation of the fluorochemical layers gave a product (35.7 grams). This yield corresponds to a yield of 30.7% of theory. Nuclear magnetic resonance (NMR) and infrared analysis confirmed the structure of the resulting diester. Elemental analysis also supported the structure of the product:

|  | Theory | Found |
| --- | --- | --- |
| Carbon | 28.19 | 28.02 |
| Hydrogen | 0.89 | 0.85 |
| Fluorine | 63.8 | 60.48±0.48 |

EXAMPLE II

The ester di-(alpha, alpha-dihydroperfluorooctyl) itaconate was prepared by reacting 100 grams of alpha, alpha-dihydroperfluorooctanol with 30% oleum (70 grams) as in Example I, with excess $SO_3$ removed by vacuum.

To the acid sulfate material, 13.0 grams of itaconic acid was added and the resulting reaction mixture was heated to 85 degrees C. for 2 hours while stirring. The mixture was allowed to cool to room temperature and then poured slowly over ice. After the ice had melted, the mixture was transferred to a separatory funnel and extracted with three 150 cc. portions of ether. A fourth extract with ether was made and flash evaporated, producing only 0.3 grams of extracted product.

The first three extractions were combined and washed with water three times. The pH of the product was then adjusted to between 5 and 6 using 6.9% sodium bicarbonate solution and then the product was washed three additional times with water. The ether extract was dried over sodium sulfate, filtered and distilled. After distilling off the ether at atmospheric pressure, the residue was distilled in vacuum. The first distillation cut boiled at 46 to 49 degrees C. at 2 millimeters pressure and weighed 53.65 grams. The second cut boiled at 126 to 134 degrees C. at 2 millimeters pressure and weighed 53.65 grams. The second cut boiled at 126 to 134 degrees C. at 2 millimeters spectrum of cut number 2 showed it to be the same product as obtained in Example I. The spectrum of cut number 1 showed it to be the starting alcohol. Part of the material (5.9 grams) was collected in a trap cooled with dry ice and acetone and also proved to be the starting alcohol. Based on the reacted alcohol, the yield was 81.4 % of theory. The improved yield obtained, compared with Example I, can be explained by the use of excess alcohol in the present example.

EXAMPLE III

The ester di-(alpha, alpha-dihydroperfluorooctyl) fumarate was prepared by adding 100 grams of alpha, alpha-dihydroperfluorooctanol with 30% oleum (70 grams) as in Example I. Excess $SO_3$ was removed by vacuum and the acid sulfate was allowed to stand at room temperature overnight.

Fumaric acid (14.5 grams) was added the following day and the temperature raised to 90 degrees C. The temperature was then maintained between 87 and 90 degrees C. for 1 hour while stirring. Additional fumaric acid (7.3 grams) was added and the conditions were held for 1 hour after which the mixture was allowed to cool to room temperature.

The following day the mixture was poured onto ice. Salt was added to assist in breaking the emulsion. The mixture was centrifuged and the aqueous layer decanted off. The product layer contained crystals which were washed three times with water by decantation. The product containing crystals was adjusted to a pH of 5 with sodium bicarbonate solution and washed again with water. The final water wash resulted in an emulsion. To cover the product, the emulsion was extracted three times with ether and sodium chloride was added to break the emulsion. The ether extracts after drying over sodium sulfate were flash evaporated to remove the ether. The product was recrystalized from methanol and melted at 68 to 74 degrees C. The weight of the recrystalized product was 19.5 grams. There was an additional 7.5 grams of crude product in the mother liquor. Ether extraction of the combined water washings gave what appeared to be additional product on the basis of infrared analysis.

NMR, infrared and elemental analysis supported the structure assigned to the product:

|  | Theory | Found |
| --- | --- | --- |
| Carbon | 27.27 | 27.13 |
| Hydrogen | 0.68 | 0.61 |
| Fluorine | 64.8 | 60.84±0.03 |

EXAMPLE IV

The ester di-(alpha, alpha-dihydroperfluorocyclohexanecarbinol) fumarate was perpared by reacting 82.8 grams of alpha, alpha-dihydroperfluorocyclohexanecarbinol with 70 grams of 30% oleum in the manner set forth in Example I.

Fumaric acid (14.5 grams) was added and while stirring the temperature was raised to 80 degrees C. An exotherm occurred, raising the temperature further to 123 degrees C. The temperature was then allowed to cool to 80 degrees C. After being maintained at approximately 80 degrees C. for 1 hour, 7.3 grams of additional fumaric acid was added and the temperature was held between 80 and 90 degrees C. for an additional hour. The dark colored reaction mixture was allowed to cool to room temperature.

The reaction mixture was poured over ice (653 grams) and allowed to stand until the ice melted. Sodium chloride was added to assist in breaking the emulsion and in salting out the product which was crystalline. The product was centrifuged and the water layer decanted off. Crystals were washed three times with water and after the pH was adjusted to 5 using sodium bicarbonate solution the crystals were washed with water again. The final water wash resulted in an emulsion. Ether was used as an extractant and sodium chloride was added to break the emulsion. The ether extract was dried over sodium sulfate. Ether was then flashed off and the crude product (38.0 grams) was recrystallized from methanol. Pure product (35 grams) melted at 61.5 to 63.5 degrees C. NMR, infrared and elemental analysis supported the structure assigned to the product:

|  | Theory | Found |
| --- | --- | --- |
| Carbon | 30.6 | 30.55 |
| Hydrogen | 0.85 | 0.94 |
| Fluorine | 59.38 | 57.40±.45 |

EXAMPLE V 149 grams of chlorosulfonic acid is slowly added to a 500 milliliter flask containing 400 grams of alpha, alpha-dihydroperfluorocyclohexane carbinol while vigorously stirring the alcohol in the flask equipped with a stirrer, a thermometer and a condenser. The rapid evolution of hydrogen chloride occurs and the reaction exotherm is controlled to a maximum of about 70 degrees C. by using ice bath cooling. The temperature of about 70 degrees C. is maintained during the remaining addition of chlorosulfonic acid. After the addition is complete, the solution is stirred for approximately 1 hour at ambient temperatures while under reduced pressure (about 20 millimeters mercury).

At atmospheric pressure, 78 grams of itaconic acid is added to the solution and the reaction is then stirred for one-half hour at 50 degrees C. The product is poured onto approximately 500 grams of ice. After the ice has melted, the mixture is extracted three times with 300 cubic centimeter portions of ether. The ether extract is washed twice with a 400 milliliter volume of water, followed by a 400 milliliter 5% aqueous sodium bicarbonate addition, followed again by a 400 milliliter water wash. The ether extract is then dried over anhydrous sodium sulfate and filtered. After removal of the ether, the product is distilled to give a recovery of 31 grams of starting alcohol and 339.7 grams of 80Based on the alcohol consumed, the yield is 80%.

EXAMPLE VI

In accordance with the method of Example II, the following dibasic acid monomers are prepared:

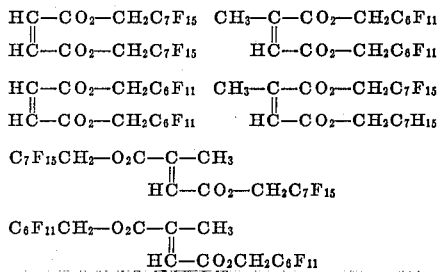

EXAMPLE VII

The monomer di-(alpha, alpha-dihydroperfluorooctyl) itaconate (11.8 grams) and benzoyl peroxide (0.0236 gram) were placed in a tube which was evacuated, flushed with nitrogen, and stoppered. The tube was then heated in an oven maintained at 60 degrees C. for 65 hours. A transparent solid formed which could be heated into solution with hexafluoroxylene. The product was dissolved in hexafluoroxylene, filtered through a millipore filter, and reprecipitated with methanol. The resulting product was vacuum dried overnight at room temperature. The $T_{10}$ value for the polymerization product was 290 degrees C., $T_{10}$ being the 10% weight loss temperature determined by thermogravimetric analysis.

EXAMPLE VIII

Three grams of di-(alpha, alpha-dihydroperfluorooctyl) itaconate was added to a 250 cubic centimeter 3 neck flask equipped with a mechanical stirrer, a condenser and a nitrogen purge system. In addition, % borax solution (3 grams), carbitol (3 grams), a blend of octylphenoxypolyethoxylates (0.33 gram of a 70% solution of Triton X-165, 0.33 gram of a 70% solution of Triton X-405, and 2.34 grams of water), and 1% ammonium persulfate solution were added to the flask. The equipment was purged with nitrogen before and during the reaction. The mixture was stirred and then lowered into an oil bath kept at 50 degrees C. for 5 hours. The emulsion was poured into a bottle and the following day it was filtered through cheesecloth.

Pure polymer was obtained from the emulsion by cooling the emulsion in a dry ice-acetone bath and diluting with methanol. The solid which precipitated was filtered off. The solid was then dissolved in hexafluoroxylene, filtered and reprecipitated with methanol. The polymeric product was dried in a vacuum oven at 50 degrees C. overnight. The $T_g$ of this polymer was 78 degrees C.; and the $T_{10}$ value was 300 degrees C., as determined by thermogravimetric analysis.

In addition to the homopolymers prepared in accordance with the method of this example, copolymers can also be similarly prepared by copolymerizing the fluoromonomer with a compatible comonomer such as acrylate and methacrylate ester monomers containing up to 10 carbon atoms in the alcohol portion of the ester moiety.

EXAMPLE IX

Three grams of di-(alpha, alpha-dihydroperfluorocyclohexylmethyl) fumarate and 0.06 gram of benzoyl peroxide were placed in a tube which had been evacuated and filled with nitrogen 3 times. The tube was sealed and placed in a bath at 80 degrees C. for 19 hours and rotated. The resulting product was heated in hexafluoroxylene and then filtered. The polymeric product (1.6 grams) was insoluble in the hexafluoroxylene and was collected on filter paper. The product was dried in a vacuum oven at 50 degrees C. overnight. The product was also insoluble in ether, acetone, dimethylsulfoxide, toluene, and perfluoroheptane at room temperature. The $T_{10}$ value of the product was 365 degrees C. as determined by thermogravimetric analysis. From a differential thermal analysis (DTA) the $T_g$ could not be determined with certainty, but was approximately 85 degrees C. or above.

EXAMPLE X

An oil, water and soil repellent fabric treating composition is prepared by mixing 1 gram of the itaconate ester of perfluoro(4-ethylcyclohexane) methanol, 6 milliliters of surfactant in solution in 94 milliliters of distilled water, comprising: 2 parts of sodium lauryl sulfate; 2 parts of non-ionic surfactant, octyl phenoxypolyethoxyethanol containing about 16 $C_2H_4O$ units; 2 parts of non-ionic surfactant, octylphenoxypolyethoxyethanol containing about 30 $C_2H_4O$ units per molecule; 1 milliliter of acetone; and 1 milliliter of 5% solution of ammonium persulfate initiator.

A Pyrex test tube is charged with the above ingredients, purged with nitrogen and sealed. The tube is then placed in a shaking machine and agitated 15 minutes at room temperature. Thereafter the tube is placed in a bath at 82 degrees C. and held there with agitation for 12 hours to form a homopolymer.

When the emulsion is diluted to 1% concentration by weight with water and tested for dry soil repellency properties the following results are obtained:

| Material | Repellency |
|---|---|
| Cotton | 1 |
| Wool | 2 |
| Nylon | 2 |
| Dacron | 2 |
| Glass Cloth | 1 |

For comparative purposes, an aqueous emulsion of the corresponding polypentadecafluorooctyl acrylate applied to cotton fabric at a 3% concentration has a soil repellency index value of 4.

EXAMPLE XI

In accordance with the emulsion polymerization technique of Example X, the maleate, mesaconate and citraconate esters of Example VI are polymerized in emulsion form.

EXAMPLE XII

Poly-di-(alpha, alpha-dihydroperfluorooctyl) itaconate is applied together with 0.22% (on weight of fabric) of solids of a copolymer latex of 95 weight percent 2-ethylhexylacrylate and 5 weight percent N-methylolacrylamide to individual pieces of 80 by 80 cotton and Dacron-cotton material to a total fluorochemical concentration of 0.11% based on the weight of the fabric. The treated fabric is then heated to a temperature between 150 and 170 degrees C. for 3 to 5 minutes. An oil repellency of 100 + and a water repellency reading of 90 is obtained for both of the treated materials.

EXAMPLE XIII

In accordance with the method of Example XII, the emulsion polymers of the maleate, mesaconate and citraconate esters of Example XI are applied to textiles to provide substantially the same results in oil and water repellency at the same total fluorochemical concentration.

EXAMPLE XIV

A latex polymer of di-(alpha, alpha-dihydroperfluorooctyl) itaconate is coapplied with 2% by weight of "Phobotex f/t/c" (methylolated melamine stearamide as described in U.S. Pat. No. 2,783,231) and 0.2% by weight of the Phobotex f/t/c of a catalyst consisting of a mixture of 7 parts by weight of aluminum glycolate and 3 parts by weight of glycollic acid to individual pieces of 80 by 80 cotton at a 0.11% total fluoropolymer concentration, based on the fabric weight. The treated fabric is then heated to a temperature between 150 and 170 degrees C. for 3 to 5 minutes in order to cure the polymer. An oil repellency rating of 100 and a water repellency rating of 100 are obtained.

The following table further demonstrates the oil and water repellency effectiveness of polymers such as those prepared in accordance with the method of Example VIII:

A. Poly-(perfluoro-4-n-butylcyclohexane) carbinol itaconate
B. Poly-(perfluoro-4-ethylcyclohexane) carbinol fumarate
C. Poly-(perfluorocyclohexane) carbinol itaconate
D. Poly-(perfluoroheptane) carbinol itaconate
E. Poly-(perfluorocyclohexane) carbinol fumarate
F. Poly-(perfluoroheptane) carbinol fumarate
G. Poly-(perfluoroheptane) carbinol citraconate Oil and Water Resistance of Textiles Treated with Polymeric Esters

| Fluoropolymer | Concentration of fluoropolymer component on cloth (Weight percent) | Repellency Oil | Water |
|---|---|---|---|
| A | 0.5 | 80 | 90 |
| B | 0.5 | 80 | 80 |
| C | 0.5 | 80 | 80 |
| C | 0.15 | 80 | 80 |
| D | 0.5 | 100+ | 90 |
| E | 0.5 | 80 | 90 |
| F | 0.15 | 100+ | 80 |
| F | 0.5 | 100+ | 100 |
| G | 0.15 | 100 | 90 |

The above table illustrates the efficacy of the fluoropolymers of the invention as treating agents for imparting oil and water repellency.

Fluoromonomers of the type described above cannot only be polymerized to form high molecular weight homopolymers but can be copolymerized with unsaturated compounds, such as acrylates, methacrylates, vinyl ethers, allyl esters, etc. to produce high molecular weight copolymers. In addition, segmented block and graft copolymers can be formed by polymerization of the fluoro-monomers in the presence of a hydrocarbon polymer. Such polymerization can be carried out in bulk, in solution and in emulsion.

EXAMPLE XV

A representative fluorine-containing segmented copolymer is prepared by agitating the selected fluoromonomer with a preformed polybutadiene emulsion in the presence of potassium persulfate at 50 degrees C. in accordance with the following procedure.

Polybutadiene emulsion is made by charging an 8 ounce glass pressure bottle with 6.99 grams of acetone by weight, 0.28 gram by weight of dodecylmercaptan, 1.04 grams of octylphenoxypolyethoxyethanol having about 16 $C_2H_4O$ units per molecule, 1.04 grams of octylphenoxypolyethoxyethanol having about 40 $C_2H_4O$ units per molecule, 27.16 grams of water (doubly distilled), 14 grams of butadiene and 7 grams of potassium persulfate solution (0.8%). The bottle, purged with nitrogen, is sealed, and placed in an end-over-end rotating reactor heated to 50 degrees C. for 16.5 hours. At the end of this time, 81.5% conversion of monomer to polymer is obtained.

A segmented fluorine-containing copolymer is then made by charging the above polybutadiene emulsion into a screwcap test tube according to the following procedure: 5.8 grams of polybutadiene emulsion (20% polymer), 2.29 grams of the itaconate ester of perfluoro(ethylcyclohexane) methanol, and 0.58 gram of 2% potassium persulfate solution are charged into the tube. The tube is purged with nitrogen, sealed and heated at 50 degrees C. for 24 hours in an end-over-end rotating reactor. The conversion to a segmented or block copolymer is essentially complete at the end of this period.

Segmented or block copolymers of the type described in Example XV yielded emulsion latices which, when applied to cotton fabric, afford excellent water repellency and oil repellency.

From the foregoing, it will be seen that this invention is well adapted to obtain all of the ends and objects hereinabove set forth, together with other advantages which are obvious and which are inherent therein. A relatively inexpensive procedure is provided by the present invention for preparing a maleate, fumarate, mesaconate, citraconate or itaconate ester of an alpha, alpha-dihydroperfluoroalcohol by sulfation and esterification. The formation of objectionable polymeric by-products is avoided by the present invention. It will also be noted that the process herein described is readily conducted in high yields without extreme temperatures or extreme pressures and without liberation of hydrogen fluoride, thus permitting the use of conventional glass-lined equipment for commercial production. As seen by the examples set forth above, the improvement resulting from the use of the present invention is particularly significant in that yields of about 80% or higher are obtained. The resulting maleate, fumarate, mesaconate, citraconate and itaconate esters of perfluorinated alcohols can be homopolymerized or copolymerized. Such polymeric materials can effectively be used to impart oil, water and soil repellency to treated substrates. Conveniently, the maleate, fumarate, mesaconate, citraconate or itaconate ester can be applied to the substrate and then polymerized.

Obviously, many other modifications and variations of the invention as hereinbefore set forth may be made without departing from the spirit and scope thereof.

What is claimed is:

1. A diester having the formula:

$$[R_fCH_2]_2R$$

where $R_f$ is $C_nF_{2n+1}[C_6F_{10}]$;
$C_6F_{10}$ is a perfluorocyclohexane ring
where $n$ is an integer of from 0 to 4;
and where R is $$[-O_2CCH{:}CHCO_2{-}], [-O_2CCH{:}C(CH_3)CO_2{-}] \text{ or } [-O_2CC(CH_2)CH_2CO_2{-}].$$

2. The diester of claim 1 wherein R is $[-O_2CCH{:}CHCO_2{-}]$.

3. The diester of claim 1 wherein R is $[-O_2CC(CH_2)CH_2CO_2{-}]$.

4. The diester of claim 1 wherein R is $[-O_2CCH{:}C(CH_3)CO_2{-}]$.

5. The diester of a dibasic acid and alpha, alpha-dihydroperfluorocyclohexanecarbinol wherein the dibasic acid is maleic, fumaric, mesaconic, citraconic or itaconic acid.

6. Di-(alpha, alpha-dihydroperfluorocyclohexanecarbinol) fumarate.

7. Di-(alpha, alpha-dihydroperfluorocyclohexanecarbinol) itaconate.

8. Di-(alpha, alpha-dihydroperfluorocyclohexanecarbinol) mesaconate.

9. Di-(alpha, alpha-dihydroperfluorocyclohexanecarbinol) maleate.

10. Di-(alpha, alpha-dihydroperfluorocyclohexanecarbinol) citraconate.

* * * * *

UNITED STATES PATENT AND TRADEMARK OFFICE
CERTIFICATE OF CORRECTION

PATENT NO. : 3,868,408
DATED : February 25, 1975
INVENTOR(S) : Dewey G. Holland and Burton D. Beitchman It is certified that error appears in the above—identified patent and that said Letters Patent are hereby corrected as shown below:

Column 3, line 3, delete "}" and insert --OCO}.--

Column 9, line 37, delete "53.65" and substitute therefor --38.3--

Column 9, line 37-38, delete "The second cut boiled at 126 to 134 degrees C. at 2 millimeters" and substitute therefor --The infrared--

Column 10, line 22 (Example III Table), delete "60.84±0.03" and substitute therefor --60.84±0.30--

Column 10, line 27, delete "perpared" and substitute therefor --prepared--

Column 11, line 24, delete "80" and substitute therefor --product.--

Column 11, line 64, after "addition," and before "%", insert --1--

Signed and Sealed this

Third Day of August 1976

[SEAL]

*Attest:*

RUTH C. MASON
*Attesting Officer*

C. MARSHALL DANN
*Commissioner of Patents and Trademarks*